(12) United States Patent
Ethier et al.

(10) Patent No.: US 7,876,714 B2
(45) Date of Patent: Jan. 25, 2011

(54) TECHNIQUES FOR MANAGING CONFERENCE SCHEDULES USING GROUPS

(75) Inventors: Randall Ethier, Burke, VA (US); David Bieselin, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 1897 days.

(21) Appl. No.: 10/931,737

(22) Filed: Sep. 1, 2004

(65) Prior Publication Data

US 2006/0045029 A1   Mar. 2, 2006

(51) Int. Cl.
   *H04L 12/16*   (2006.01)
(52) U.S. Cl. .................. 370/260; 708/112; 379/202.01; 379/265.09; 705/8
(58) Field of Classification Search ........... 705/8, 705/14, 12, 9, 10; 708/112; 370/260; 379/202.01, 379/265.09
   See application file for complete search history.

(56) References Cited

U.S. PATENT DOCUMENTS

| | | | |
|---|---|---|---|
| 4,626,836 A | 12/1986 | Curtis et al. | |
| 4,807,154 A | 2/1989 | Scully et al. | |
| 4,807,155 A | 2/1989 | Cree et al. | |
| 4,817,018 A | 3/1989 | Cree et al. | |
| 4,819,191 A | 4/1989 | Scully et al. | |
| 4,977,520 A | 12/1990 | McGaughey, III et al. | |
| 5,050,077 A | 9/1991 | Vincent | |
| 5,197,000 A | 3/1993 | Vincent | |
| 5,261,045 A | 11/1993 | Scully et al. | |
| 5,774,867 A | 6/1998 | Fitzpatrick et al. | |
| 5,933,810 A | 8/1999 | Okawa | |
| 5,987,463 A | 11/1999 | Draaijer et al. | |
| 6,047,260 A | 4/2000 | Levinson | |
| 6,167,379 A | 12/2000 | Dean | |
| 6,275,575 B1 | 8/2001 | Wu | |
| 6,363,352 B1 | 3/2002 | Dailey et al. | |
| 6,396,510 B1 | 5/2002 | Pendse et al. | |
| 6,781,920 B2 | 8/2004 | Bates | |
| 7,027,996 B2 | 4/2006 | Levinson | |
| 7,283,970 B2 | 10/2007 | Cragun | |
| 7,299,193 B2 | 11/2007 | Cragun | |
| 7,343,312 B2 | 3/2008 | Capek et al. | |

(Continued)

OTHER PUBLICATIONS

U.S. Non- final Office Action dated Mar. 25, 2009 for U.S. Appl. No. 10/983,283.

(Continued)

*Primary Examiner*—Fan Tsang
*Assistant Examiner*—Simon King
(74) *Attorney, Agent, or Firm*—Brinks Hofer Gilson & Lione (57) ABSTRACT

A method and apparatus for scheduling a conference among multiple persons includes receiving group data that indicates persons in a first group. Availability data is received from a shared database that includes information about availability for a conference of a population of persons that includes the persons from the first group. Quorum data is received that indicates that a quorum for a particular conference includes any one or more persons in the first group and less than all persons in the first group; thus the first group is a called a "representative group." A proposed time interval that satisfies the quorum based on the group data, the availability data, and the quorum data is determined for the particular conference.

50 Claims, 3 Drawing Sheets

U.S. PATENT DOCUMENTS

| | | | |
|---|---|---|---|
| 2002/0065689 | A1 | 5/2002 | Bingham et al. |
| 2002/0069406 | A1 | 6/2002 | Aaltonen et al. |
| 2002/0163572 | A1 | 11/2002 | Center et al. |
| 2003/0149605 | A1* | 8/2003 | Cragun et al. ............. 705/8 |
| 2003/0174826 | A1 | 9/2003 | Hesse |
| 2003/0204474 | A1 | 10/2003 | Capek |
| 2003/0233265 | A1* | 12/2003 | Lee et al. ............. 705/8 |
| 2004/0064355 | A1 | 4/2004 | Dorenbosch et al. |
| 2004/0078256 | A1 | 4/2004 | Glitho |
| 2005/0027581 | A1 | 2/2005 | Kjesbu et al. |
| 2005/0071213 | A1 | 3/2005 | Kumhyr et al. |
| 2006/0010023 | A1* | 1/2006 | Tromczynski et al. ....... 705/8 |
| 2008/0228547 | A1 | 9/2008 | Doss et al. |

OTHER PUBLICATIONS

U.S. Non-Final Office Action dated May 12, 2009 for U.S. Appl. No. 10/984,402.

Non-Final Office Action dated Oct. 16, 2009 cited in U.S. Appl. No. 10/983,283 (BHGL Ref. No. 13522-00225).

Non-Final Office Action dated Oct. 13, 2009 cited in U.S. Appl. No. 10/984,402 (BHGL Ref. No. 13522-00226).

Non-Final Office Action dated Oct. 7, 2009 cited in U.S. Appl. No. 10/958,523 (BHGL Ref. No. 13522-00227).

Beard, David; Palaniappan, Murugappan; Humm, Alan; Banks, David; Nair, Anil; Shan, Yen-Ping. "A visual Calendar For Scheduling Group Meetings". Oct. 1990. CSCW 1990 Proceedings. pp. 279-290.

Hayes, Thomas; Sen, Sandip; Arora, Neerag; Nadella, Rajani. "An Automated Meeting Scheduling System that Utilizes User Preferences." 1997. International Conference on Autonomous Agents. Proceedings of the First International Conference on Autonomous Agents. pp. 308-315.

Gu, P.; Balasubramanian, S.; Norrie, D.H., "Bidding-Based Process Planning and Scheduling in a Multi-Agent System," Computers Ind. Engng, 32(2):477-496 (1997).

Garrido, Leonardo; Sycara, Katia "Multi-Agent Meeting Scheduling: Preliminary Experimental Results," *AAAI Proceedings of the Second International Conference on Multiagent Systems*, (1996).

Sen. Sandip; Durfee, Edmund H., "On the Design of an Adaptive Meeting Scheduler" *IEEE in Proc. Of the Tenth Conference on AI Applications* (1994).

Chang-Shing Lee, Chen-Yu Pan, An Intelligent Fuzzy Agent for Meeting Scheduling Decision Support System, *Fuzzy Sets and Systems*, 142(3):467-488 (2004).

Non-Final Office Action dated Apr. 12, 2010 cited in U.S. Appl. No. 10/983,283 (BHGL Ref. No. 13522-225).

Final Office Action dated Apr. 30, 2010 cited in U.S. Appl. No. 10/958,523 (BHGL Ref. No. 13522-227).

Non-Final Office Action dated Mar. 30, 2010 cited in U.S. Appl. No. 10/984,402 (BHGL Ref. No. 13522-226).

Notice of Allowance dated Sep. 29, 2010 in U.S. Appl. No. 10/984,402 filed Nov. 9, 2004.

Notice of Allowance dated Sep. 29, 2010 in U.S. Appl. No. 10/983,283 filed Nov. 5, 2004.

* cited by examiner

TECHNIQUES FOR MANAGING CONFERENCE SCHEDULES USING GROUPS

BACKGROUND OF THE INVENTION

1. Field of the Invention

The present invention relates to using a calendar system and other availability data shared among users to schedule conferences (including meetings) among users, and in particular to schedule a conference based on the definition of one or more groups of users.

2. Description of the Related Art

A number of software applications are available for scheduling conferences among busy members of an organization. For example, a commercial meeting scheduling application is available from Meeting Maker Inc. of Waltham, Mass.; and from Latitude of Santa Clara, Calif. These applications have in common a database that stores information related to a calendar of conferences and appointments each member is scheduled to attend. Such a database is herein called a shared electronic calendar. For purposes of the following discussion, the term conference includes any simultaneous coming together of multiple parties for communication, whether involving a meeting held in person or involving remote communications, including data, audio, video, or multi-media communications, or some combination of in-person meetings and remote communications.

For example, some systems allow a conference organizer user (the "organizer") to specify a list of mandatory attendees and a list of optional attendees from the organization. The scheduling application ("scheduler") then determines one or more proposed times that all the mandatory attendees can attend a meeting based on data in the organization's shared electronic calendar. The proposed times are presented one at a time in chronological order. The scheduler also lists the optional attendees who are also available to attend each proposed time. The organizer then sends a message to the selected attendees for one of the proposed times, inviting them to attend the meeting.

While greatly simplifying the task of finding times when a limited number of persons are available for a conference, the existing systems still suffer some deficiencies.

For example, under some circumstances, such as when the list of mandatory attendees is large, the first proposed time may be too distant to be useful for the purposes of the conference. For example, the purpose of the meeting may be to determine what research results to present at an upcoming scientific convention. When the first proposed time is too close to, or after, the start of the convention, the first proposed time is not useful for accomplishing the purpose of the meeting. The existing systems do not give an organizer sufficient automatic choices to resolve such a scheduling conflict.

One approach would be for an organizer to identify one or more representative groups of persons without requiring a particular member of the group to attend.

For example, suppose that a conference is desired to determine what research to present at a scientific convention on the topic of possible prion-based diseases above and beyond bovine spongiform encephalopathy (also known as "Mad Cow" disease). In this example, the determination requires the attendance of a scientists in six disciplines including discipline A (protein biochemistry), discipline B (poultry and wild game bird biology), discipline C (domesticated and wild game swine biology), discipline D (domesticated and wild bovine biology), discipline E (ichthyology), and discipline F (medical pathology). Furthermore, in this example, the organization includes two scientists in each discipline, but due to their busy schedules, as reflected in their electronic calendars, all twelve of these scientists cannot convene for a joint conference until after the scientific convention. Only one person of each pair of scientists in each discipline need attend the pre-convention conference. Thus a minimum of six scientists are need for a quorum, provide they represent the six disciplines. There are $2^6$ (i.e., 64) combinations of minimum conference attendees which are acceptable in this example.

With extant scheduling systems, an organizer has to enter all 64 combinations manually and obtain one or more proposed dates for each combination. Then the organizer would have to review the 64 or more possible dates and select a best one, e.g., the earliest. This is a tedious, time consuming, and error-prone process. In most instances, the organizer would try a few of the 64 combinations and then either give up or settle for a date that is not optimal.

Even if the organizer perseveres through 64 manual combinations, there still may be no proposed date that is sufficiently before the scientific convention to allow the issue of interest to be addressed and acted upon. The current systems do not resolve conflicts, e.g., the current systems do not identify which group or groups are most responsible for causing the greatest delay and do not offer to management an approach to resolve the conflict.

Clearly, there is a need for a conference scheduling system that does not suffer the deficies of current conference scheduling systems.

The approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

SUMMARY OF THE INVENTION

Techniques are provided for scheduling conferences based on the definition of one or more groups, wherein any one or more members of each group can satisfy a quorum.

In one set of embodiments, a method for scheduling a conference among multiple persons includes receiving group data that indicates persons in a first group. Also received is availability data from a shared database that includes information about availability for a conference of a population of persons. Also received is quorum data that indicates that a quorum for a particular conference includes any one or more persons in the first group and less than all persons in the first group. The first group is a representative group. A proposed time interval for the particular conference is determined that satisfies the quorum based on the group data, the availability data, and the quorum data.

In some embodiments of this set, the availability data includes scheduled availability data based on data in a shared calendar database, or current availability data based on presence data, or both.

In some embodiments of this set, determining the proposed time interval includes determining multiple combinations of persons that satisfy the quorum and selecting a particular combination based on a conference preference criterion. In some of these embodiments, conference preference criterion is based on available date, location, language, local time of day, or travel cost to attend the particular conference associated with each combination, or some combination of these.

In some embodiments of this set, the method includes receiving limit data that indicates a limit for a property of the particular conference, such as a limit on a date, a time of day, a location, a common language, or a travel cost, or some combination The step of determining the proposed time interval includes determining whether both the quorum and the limit can be satisfied. In some of these embodiments, the step of determining the proposed time also includes determining which group is a blocking group that is most responsible for not satisfying the limit, and displaying blocking data that indicates the blocking group for the particular conference. In some embodiments of this set, the particular conference is a multi-date conference and a combination of persons satisfies the conference limits if each person in the combination is available for more than one date of the multi-date conference.

In other sets of embodiments, a computer readable medium and a system are provided that implement the steps of the above methods.

These methods support the definition of more flexible quorums, using groups, which allow useful conferences to take place more readily by reducing conflicts. In addition these methods support finding the best combination of attendees in terms of arbitrarily defined conference preferences, such as earliest time or lowest travel costs. These methods also support resolving conflicts by identifying which group or groups are most responsible for causing the greatest delay, or other deviation from more preferred conferences. A manager therefore may intervene more effectively to change the operation of the identified group most responsible for the delay.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for scheduling a conference are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the invention are described in the context of using data from an electronic calendar, but the invention is not limited to this context. In other contexts, other data may be used instead of or in addition to data from an electronic calendar, such as flat files of scheduled conferences and attendees, electronic personnel travel requisitions, data indicating the presence of a user on a network (called herein "presence data") including a wireless network, a large area network, the internet or a cellular telephone network, and data indicating resources scheduled for a conference, such as network equipment, conference room, and conference room equipment.

Presence data is used in several extant and emerging applications. For example, in instant messaging applications, such as AOL Instant Messenger (AIM) from America Online of Dulles, Va. and PresenceWorks of PresenceWorks, Inc in Alexandria Va., presence data indicates the instantaneous knowledge that someone is available online and reachable via instant messaging. More broadly, presence data indicates a dynamically changing set of channels, capabilities, characteristics, preferences and ability for persons to communicate and interact with each other. It includes such states as "online," "offline," "do not disturb," "at lunch." Some applications consider other availability information as presence data, including information that indicates, for a particular person, "try mobile phone first, then business line", "always send e-mail" or "unavailable for conference calls, but available for webcasts." In some applications, presence data may include physical location of the person such as "on travel in London," or "at home," or "in office" or "at company headquarters," as well as a network address. In some applications, presence data indicates people on the same (virtual) location like a web page or a shared document. In some applications, presence data indicates people who are within the same cell (the geographical area covered by a cellular phone transmitter). In some applications, presence data indicates location of a person or facility based on a positioning system, such as the Global Positioning System (GPS) widely used in commerce or by the military.

1. Structural Overview

Figure 1:
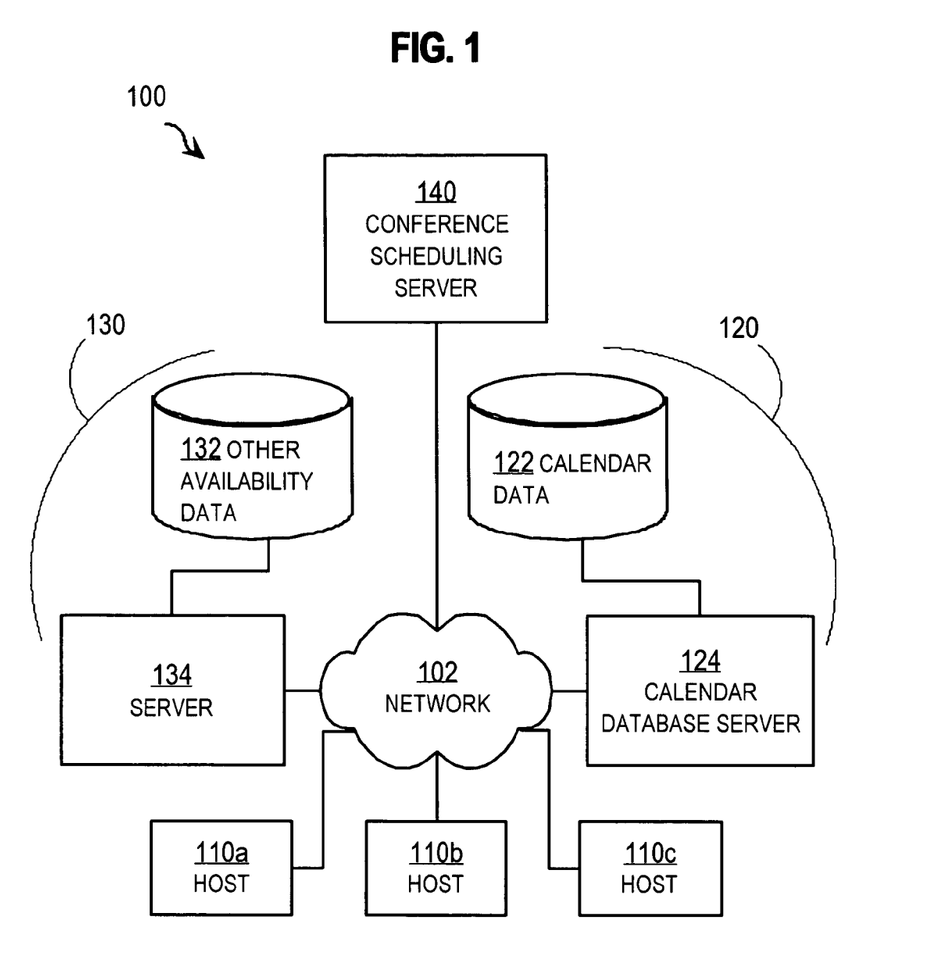
FIG. 1 is a block diagram that illustrates a system with data and servers for scheduling a conference, according to an embodiment.

FIG. 1 is a block diagram that illustrates a system 100 with data and servers for scheduling a conference, according to an embodiment. The system 100 includes a network 102, hosts 110a, 110b, 110c (collectively referenced hereinafter as hosts 110), an electronic calendar 120, other availability data systems 130, and a conference scheduling server 140.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple servers on multiple hosts (sometimes called tiers) for reasons that include reliability, scalability, and redundancy, but not limited to those reasons.

The network 102 is any network that connects a variety of users of host computers, including, but not limited to, local area networks (LANs), wireless networks, wide-area networks (WAN), the Internet (a network of heterogeneous networks using the Internet Protocol, IP), and virtual private networks. In an embodiment using a single stand alone system, network 102 may be omitted.

The hosts 110 are computers to which a population of potential participants in conferences (the "conference population"), or their human agents such as secretaries and assistants, have access. The hosts are connected to network 102. For the purposes of illustration, three hosts 110a, 110b, 110c are shown in FIG. 1. In other embodiments more or fewer hosts are connected to network 102. In an embodiment using a single stand alone system, only one host, e.g., host 110a, is used.

The system 100 includes a calendar database system 120, which includes a calendar database server 124 and calendar data 122 on one or more storage devices. The calendar database server controls the storage and retrieval of calendar data 122. For purposes of illustration calendar database server 124 is shown separate from hosts 110; but in some embodiments, calendar database server 124 resides in part or in whole on one or more of hosts 110. Furthermore, for purposes of illustration, one calendar server 124 is connected to one storage device with calendar data 122, but in other embodiments, the calendar data may be distributed over several data storage devices connected directly to one or more calendar database servers like server 124, or connected indirectly to one or more servers through network 102. Any calendar database system known in the art may be used as calendar database system 120. In various embodiments, system 100 includes more or fewer calendar database systems like system 120.

Calendar data typically includes one or more data structures that hold data indicating a person from the population and zero or more commitments of time for that person, including data indicating a start date and time and stop date and time for the commitment. In some embodiments, a description of the commitment, or a location associated with the commitment, or both, are included in the calendar data for each commitment.

The system 100 includes another availability data system 130, which includes a server 134 and other availability data 132 on one or more storage devices. The server 134 controls the storage and retrieval of availability data 132. For purposes of illustration server 134 is shown separate from hosts 110; but in some embodiments, server 134 resides in part or in whole on one or more of hosts 110. Furthermore, for purposes of illustration, one server 134 is connected to one storage device with other availability data 132, but in other embodiments, the other availability data may be distributed over several data storage devices connected directly to one or more servers like server 134, or connected indirectly to one or more servers through network 102. Any person availability data system or resource availability data system or personnel data system known in the art may be used as other availability system 130. A person availability data system is any system that includes data that indicates the availability of one or more persons in the conference population, including systems that generate or utilize presence data that indicates the physical or network location of a person at a current time and systems that use location data that indicates the current or expected location of a person, such as a travel request processing system or a human resources employee leave processing system In various embodiments, system 100 includes more or fewer availability data systems like system 130. In some embodiments, one or more servers like server 134 are embedded in calendar database server 124. In some embodiments, calendar database system 120 is omitted; and, in some other embodiments, the other availability system 130 is omitted.

The system 100 includes a conference scheduling server 140. The conference scheduling server 140 determines the time or attendees or location or other properties of a conference, or some combination. For purposes of illustration, conference scheduling server 140 is shown separate from hosts 110 and servers 124, 134; but in some embodiments, conference scheduling server 140 resides in part or in whole on one or more of hosts 110 or on a host with other depicted systems 120, 130 or as part of servers 124, 134. In some embodiments, the conference scheduling server 140 may be distributed over several hosts connected to network 102.

2. Functional Overview

Sufficient involvement by persons from the conference population to hold a conference is a quorum for the conference. According to embodiments of the invention, a quorum for a conference is defined based on having one or more members from each of one or more representative groups, without requiring all members from any representative group. By using representative groups to define a quorum, it is easier to avoid conflicts. A person attempting to schedule a meeting determines the type of expertise or authority that is important to conduct the business of a conference, and identifies two or more persons from the conference population that provide each desired expertise or authority. Those two or more persons for each desired expertise or authority constitute a representative group for the conference. A quorum can be defined by a combination of groups and a minimum number of members to attend from each group. Predefined groups may be used, such as departments or job classifications or email lists or combinations of these. A conference scheduling system then uses the representative groups defined for the quorum, the group rosters, and the calendar or other availability data for the people on the group rosters to determine when a conference can be held.

In various embodiments, the conference organizer may specify properties of the conference, such as its duration and a description of the topic, which the scheduling system uses in determining the conference time or for alerting invitees. The system may report not only on the time, but also give the list of invitees, their locations at the time of the conference, their notification addresses, and other data relevant to scheduling the meeting. The system may automatically send invitations to the meeting to the invitees.

Of many possible meeting times for the conference, the system selects one along with zero or more alternatives. For example, as a default, the system may select the earliest time when a quorum can be met, and determine as alternatives the next two times when a quorum can be met, to be presented when the organizer or an invitee rejects the selected time. Instead of using the earliest time, the system may select a conference that has the most people at a common location, or the most people speaking a common language, or the smallest differences in local times. In some embodiments, the organizer can specify how to select among several possible meeting times.

In addition, in some embodiments, the organizer puts limits on the meeting. For example, the organizer specifies that the conference must occur before a certain date or in a certain range of dates, or that the conference be conducted in a particular language. These limits may be impossible to meet and still have a quorum. For example, it may be impossible to have the minimum number of persons from each representative group within a particular range of dates. If the limits can't be met with the current group and quorum definitions, the organizer is notified of a conflict. Often, the primary cause of the conflict is a group, e.g., a group whose members are completely committed throughout the date range. In some embodiments, the primary cause of the conflict is identified as a blocking group and reported to the organizer. A manager can use this information to remove the conflict, such as by assigning more staff to a department associated with the blocking group so that a member of the blocking group is freed to attend the conference.

3. Method for Scheduling a Conference

Figure 2:
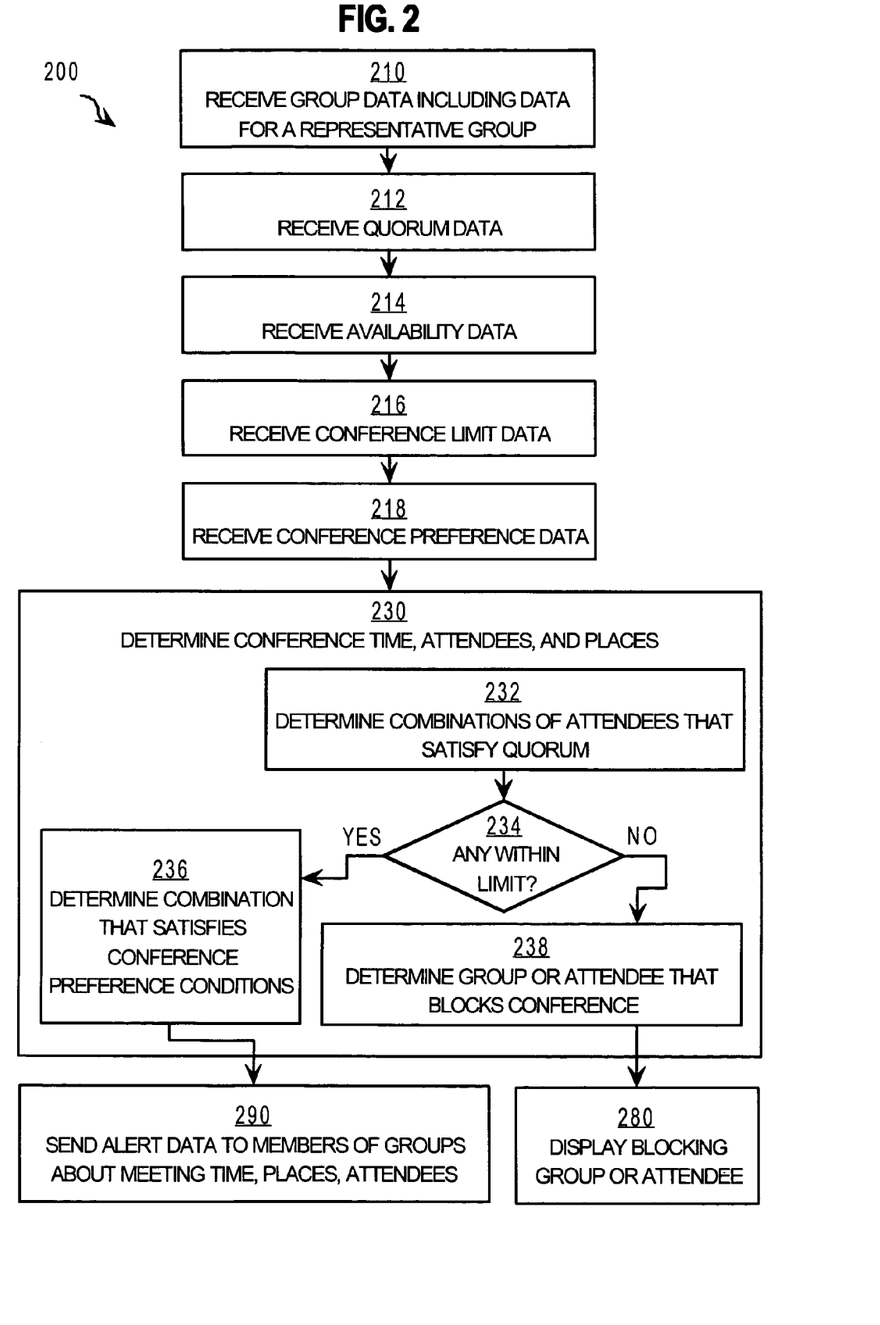
FIG. 2 is a flow diagram that illustrates a method for scheduling a conference, according to an embodiment.

To illustrate this method, an example embodiment is described. FIG. 2 is a flow diagram that illustrates a method 200 for scheduling a conference, according to an embodiment. Although steps are indicated in a particular order in FIG. 2, in other embodiments, the steps may be performed in a different order or overlapping in time. For example steps 210 through 218 may be performed in any order or may overlap in time. In addition, in some embodiments one or more steps are omitted.

In step 210, the scheduling process receives group data. Any method may be used to receive the group data. In some embodiments, the groups may be predefined and stored within source code or in files stored with the executable code or in files or a database accessible to the scheduling server. In some embodiments, the organizer inputs a group identifier and a list of persons who make up the group from the population either in response to prompts from the process or independently of prompts. In some embodiments, the list of persons is based on predefined lists, such as email lists, department lists, job title lists, or some combination. In some embodiments, the group data is included in a message sent to the server 140 from a client process on a host 110 operated by an organizer. In some embodiments, step 210 includes mapping groups across different applications, including, for example, but not limited to, the conferencing system, instant messaging, email, and enterprise directories. For example an enterprise division called "Voice Architecture" has eight (8) members. In the enterprise directory those members are grouped under the name of their boss, e.g. "M. Boss." Those same members have an email alias called "smarch." A member of that division also has a conferencing system alias "VAdiv" for those members and their boss. The groups "M. Boss," "smarch" and "VAdiv" are not linked. In some embodiments of step 210, the group is defined once (e.g., "MBossDiv") and then used in all of these applications: the conferencing system, instant messaging, email, and enterprise directories.

In an illustrated example, the group data received indicates that there are six groups (A, B, C, D, E, F), each with four persons. In some embodiments, the same person appears in more than one group. For example, an electrical engineer who is also department head may appear in a group for a particular technical expertise and in another group for organizational approval authority.

In step 212 the scheduling process receives quorum data. Any method may be used to receive the quorum data, such as listed above for receiving group data, including, but not limited to predefined data stored within source code or in files stored with the executable code ("default values") or in files or a database accessible to the process, organizer input either in response to prompts from the process or independently of prompts, or from data included in a message sent to the conference scheduling server 140 by another server or from a client process, such as a client process on a host 110 operated by an organizer.

The quorum data indicates one or more groups and the minimum number of persons from each group. In an illustrated embodiment, the quorum data indicates a minimum of zero members from group A, a minimum of one member from each of groups B, C, and D, a minimum of two members from group E, and a minimum of four members from group F. A group for which a minimum of zero members make a quorum, like group A, is called an optional group; all its members are optional attendees. One optional group with optional attendees is used in some commercial systems. A group with a minimum of one or more members but less than all the members of the group is called a representative group. Groups B, C, D and E are representative groups. At least one member attends to represent each of these groups, but the entire group need not attend. Such representative groups are not used in current commercial systems. A group for which a minimum of all members make a quorum, like group F, is called a mandatory group. One mandatory group of attendees is used in some commercial systems.

A quorum can be expressed as a Boolean combination of groups, and in some embodiments of the scheduling process, this is allowed. For example, a quorum can be expressed as a minimum of:

0 from A and ((1 from B and 1 from C) or 2 from D).

In the illustrated embodiment, the quorum is expressed as a minimum of:

0 from A and 1 from B and 1 from C and 1 from D and 2 from E and all from F.

In step 214, the process receives availability data (which, as indicated above, includes location or presence data, or both, in some embodiments). Any method may be used to receive the availability data, such as listed above for receiving group data, including, but not limited to data in files or a database accessible to the process, user input either in response to prompts from the process or independently of prompts, or from data included in a message sent to the conference scheduling server 140 by another server or from a client process, such as a client process on a host 110 operated by a user or the organizer.

For example, in some embodiments a conference scheduling server 140 embedded in a calendar database server 124 accesses data directly from the calendar data 122. In some embodiments, a separate conference scheduling server 140 sends a query message to calendar database server 124 to retrieve data from the calendar data 122 and receives availability data in a return message. In some embodiments, conference scheduling server 140 sends a query message to server 134 to retrieve data from other availability data 132 and receives availability data in a return message. In some embodiments, the query message includes data identifying one or more persons in the specified groups. In some embodiments, step 214 is performed after step 232, described below, and the query message includes data identifying one or more persons in a combination that satisfies a quorum.

In step 216, the process receives conference limit data. Any method may be used to receive the conference limit data, such as listed above for receiving group data, including, but not limited to predefined default values stored within source code or in files stored with the executable code, or data in files or a database accessible to the process, or organizer input either in response to prompts from the process or independently of prompts, or from data included in a message sent to the conference scheduling server 140 by another server or from a client process, such as a client process on a host 110 operated by an organizer. The conference limit data is used to further constrain the properties of conference beyond that set by the quorum and availability of persons from the population. The limit data may be based on any property of the conference including, but not limited to, the duration of the conference, the date of the conference, a time of day, a location, common language, and travel cost, or some combination.

For example, in an illustrated embodiment, the default values of the limits are a duration of one hour, a time after the present time, and access to audio communications with no other constraints. Available persons may be located anywhere there is audio communications supported, such as any location with a telephone. In the illustrated embodiment, the organizer is then prompted to indicate different or additional limitations for the conference, e.g., based on other dates, location, language, local time of day or travel costs, among others, or some combination.

For example, in an illustrated embodiment, the organizer wishes to hold a half day multimedia conference with audio and video and data communications within two months, therefore the process receives conference limit data specifying a duration limit of no less than four hours, a date limit of before two months from present, and a location limit to those facilities that support audio/video/data communications.

In some other embodiments, the organizer wishes to hold an in-person meeting and therefore the conference limit data indicates a limit of any single location or a particular location for the conference. In some embodiments, the conference limit data indicates the conference must be held on the current day. In some embodiments, the conference limit data indicates that the local time of day not extend past midnight or before 6 AM. In some embodiments, the conference limit data indicates that total estimated travel costs not exceed $25,000.

In some embodiments, there are language limitations. For example, in some embodiments the conference limit data indicates that there be no more than two languages needed to communicate and that one of these two be English. As another example, in some embodiments the conference limit data indicates that there be sufficient overlap of languages that information can be conveyed to any member of the quorum either directly or indirectly from other members of the quorum using only members of the quorum, not one or more outside translators. In some embodiments, the conference limit data indicates that indirect communications from another member of the quorum involve no more than a particular number of translations, e.g., no more than one translation. For purposes of illustration, it is assumed that there are three members of a quorum (Klaus, Francois, and Bob) who each speak two languages as indicated in Table 1, below, but who do not share a common language.

TABLE 1

Example of language fluencies in a quorum.

| Person | German | Russian | French | Italian |
|---|---|---|---|---|
| Klaus | Yes | Yes | No | No |
| Francois | No | No | Yes | Yes |
| Bob | No | Yes | No | Yes |

A conference can be conducted in this example, with no more than one translation by Bob (a member of the quorum) if Klaus participates in Russian and Francois participates in Italian; thus this quorum satisfies the limitation that indirect communications among members of the quorum involve no more than one translation.

In some embodiments, a multi-date conference is being planned. For example, an organizer wishes to hold monthly meetings of one hour on the first Tuesday of each month for a six month duration of a certain project. In this case, the conference limit data specifies six dates for the first Tuesdays of the next six months. In some of these embodiments, the conference limit data also indicates a number of dates that a person must miss of the multi date conference to exceed the limits of the multi-date conference.

In step 218, the process receives conference preference data. Any method may be used to receive the conference preference data, such as listed above for receiving group data, including, but not limited to predefined default values stored within source code or in files stored with the executable code or data in files or a database accessible to the process, organizer input either in response to prompts from the process or independently of prompts, or from data included in a message sent to the conference scheduling server 140 by another server or from a client process, such as a client process on a host 110 operated by an organizer. The conference preference data is used to guide the determination of a conference time when there are more than one proposed times that satisfy all constraints. Constraints include the quorum, the availability of persons in the population and other limits set, if any, as described in more detail above for step 216.

For example, in an illustrated embodiment a default value for the conference preference data is to select the earliest time for which all constraints can be met. In the illustrated embodiment, the organizer is then prompted to indicate a different preference for the conference, e.g., based on other conditions of dates, location, language, local time of day or travel costs, among others, or some combination.

For example, in some embodiments the date preference is for a latest date within the constraints. In some embodiments, the preference is for a conference for which the available persons are most centrally located, either geographically, or in terms of population density, taking into account where the persons are located at one or more different times as recorded in the availability data. In some embodiments, the preference is for a conference based on the languages spoken by the available persons so that the fewest different languages are needed to communicate during the conference. In some embodiments, the preference is for a conference based on the local time where the available persons are located so that the smallest deviation from normal working hours occurs with the selected conference. In some embodiments, the preference is for a conference based on estimated travel costs so that cost of travel to the conference sites is the lowest among possible conferences that satisfy the constraints.

In step 230, the process determines a proposed time for the conference that satisfies all the constraints, if possible. In some embodiments, one or more alternative proposed times for the conference that also satisfy the constraints are also determined. If such proposed times are possible, step 230 includes determining a list of the available persons that satisfy the quorum at the proposed time with or without determining other properties of the conference. For example, in an illustrated embodiment, step 230 also determines the location or locations for the conference and the language or languages to be spoken. In an illustrated embodiment, step 230 includes steps 232, 234, 236, and 238.

In step 232, multiple combinations of persons that would minimally satisfy the quorum are determined. For example, in the illustrated embodiment there are four different permutations of single persons from each of groups B, C, D and six permutations of two people from the four people in group E, one permutation of no people from group A and one permutation of all four people from group F that would minimally satisfy the quorum, yielding a total of 1×4×4×4×6×1=384 combinations. If the same person appears in more than one group, some of these combinations are more than minimal and can be dropped from the combination set. For example, if the same person is a member of group B and C, the one combination from group B including that person need not look at the other three combinations with different people from group C, reducing the number of combinations by 3 for each of the other combinations of D and E, for a total reduction of 72 combinations that minimally meet the quorum. One or more meeting times can be found when all the persons of any of these combinations are available, even if those times are years away. If at any of these times additional persons from those groups are also available, those persons are also bonus potential attendees for the conference.

In step 234 the properties of the conferences associated with each combination are compared to the limits set for the conference. If any combination exceeds the limits, that combination is rejected. In some embodiments, the rejected combination is assigned a measure of deviation from the limits. Any method may be used to determine the measure of deviation. For example, a combination that yields a proposed meeting time that is five months in the future when the time limit for the conference is two months is given a measure of deviation that is proportional to the time difference of three months. For another example, when the time limit for the conference is two months, the limit on the number of languages is two languages, and the travel cost limit is $25,000, then a combination that yields a proposed time that is five months in the future and proposed attendees that need at least four languages to communicate and involves $35,000 of estimated travel costs is given a measure of deviation based on a weighted sum of the differences in time (e.g., 3 months) languages (e.g., 2 languages) and estimated travel costs (e.g., $10,000).

The properties associated with a combination are based on the properties associated with the persons in the combination. In some embodiments, the properties associated with persons in a combination are obtained from the calendar data 122. In some embodiments, only the person and time is included in the calendar data 122. Other properties associated with the person, and relevant for the meeting such as the person's location, the person's languages and fluencies, and the person's residence are included in one or more other databases included in the other availability data 132. Also included in the other availability data 132 is non-personal information, such as information about facilities for holding audio, video or data teleconferences, information about conference room facilities, and information about estimated travel costs to those facilities from various locations.

In some embodiments with a multi-date conference limit, a combination is not rejected if any person in the combination misses a single date of multiple dates for the conference. Instead, in these embodiments, a different number of missed dates for a person in the combination greater than one, causes the combination to be rejected. For example, in some embodiments, the number of dates missed by a single person to cause a combination to be rejected is half or more of the number of dates in the multi-date conference. In some embodiments, the number of missed dates that leads to rejection is received during step 216, described above.

If any combinations satisfy the quorum and limits, control passes to step 236. In step 236, one or more of the combinations that satisfy the constraints are selected for determining the proposed time, and zero or more alternative times for the particular conference. During step 236 the properties of the combinations that satisfy the constraints are determined and compared according to the conference preference data.

For example, it is assumed for purposes of illustration in a illustrated embodiment that three combinations, designated in temporal order X1, X2, X3, satisfy the quorum of one representative from groups B, C, D, two representatives from group E and all four members of mandatory group F, and satisfy the limits of occurring within two months, using no more than two languages, one of which is English, and involving no more than $25,000 in estimated travel cost. If the conference preference data indicated the earliest date, combination X1 is selected to determine the proposed time, attendees, locations and associated properties of the resulting conference. If the conference preference data indicated the latest date, combination X3 is selected to determine the proposed time, attendees, locations and associated properties of the resulting conference.

In some embodiments, step 236 includes presenting the proposed times of one or more combinations (e.g., all three combinations X1, X2 and X3) to the organizer, along with values for one or more properties of the resulting meeting, ranked based on the conference preference data. The organizer may manually override the automatic first choice and choose any of the proposed times presented or choose not to hold the conference.

Control then passes to step 290 to send alert data to members of the groups about the selected conference time. In some embodiments, step 290 is omitted. In some embodiments, step 290 is performed automatically.

In the illustrated embodiment, step 290 includes sending data about the place and other attendees of the conference and other properties of the conference. Persons who are among the combination that satisfies the constraints are notified that their attendance is mandatory for the particular meeting. In the illustrated embodiment, other persons in one or more groups are also invited to attend. In some embodiments, other properties of the conference are also sent to one or more members of the groups.

Once a person is sent an invitation, in many embodiments that person has the option of rejecting the invitation. In some embodiments, step 290 includes a step in which it is determined whether a mandatory participant for a selected conference time rejects the invitation. If so, control passes back to step 236 to automatically determine the next alternative that meets all of the criteria for the meeting (the next alternative may include the same mandatory participant but at a different time). In some embodiments, the organizer (i.e., the owner of the meeting) is informed of the rejection and the next alternative so that the organizer can review the change before the previous invitation is withdrawn and the alternative is propagated to the new mandatory and optional attendees. If no alternative remain after a rejection, control passes to step 238.

If it is determined in step 234 that no combination satisfies the quorum and limits, control passes to step 238. In step 238, one or more of the groups is determined to be a blocking group that is most responsible for not satisfying the conference limits. Any method may be used to determine the blocking group.

In one embodiment, the blocking group is determined as follows. One or more statistics of the measures of deviation found for the quorum is derived. For example a minimum, average, and maximum measure of deviation for the combinations based on the original quorum are determined. A test quorum is then defined that drops one of the groups from the quorum (e.g., makes the group an optional group) and new statistics of the measures of deviation for the test quorum are derived. This process is repeated by reinserting the first dropped group and dropping a different group. The group for which removal leads to the greatest decrease in the statistics of the measures of deviation, or leads to one or more combinations that satisfy the conference limits, is determined to be a blocking group. There may be multiple blocking groups. In some embodiments, the groups are ranked by the decrease in statistics of measures of deviation.

By definition, an optional group is never a blocking group. If the mandatory group is the blocking group, then, in some embodiments, the person in the mandatory group most responsible for not satisfying the limits is identified as a blocking person Any method may be used to determine the person most responsible for not satisfying the conference limits.

After the blocking group or groups are determined, control passes to step 280. In step 280, the blocking group or groups are displayed. Any manner of display may be used. For example, in some embodiments, an email is sent to the conference organizer or to one or more managers of the blocking group, or both indicating the blocking groups for a proposed conference.

In some embodiments, step 280 includes sending a message to members of the blocking group indicating that most mandatory attendees except a member of their group can attend the conference. In some embodiments, the message includes a request for at least one of them to change things around to enable a sufficient number of persons of the group to attend. In some embodiments, such a message is not sent unless a certain number of other invitees can attend, e.g., there are fewer than 25% blocking or rejecting groups. In some embodiments, such a message is also sent to one or more mangers of the members of the blocking group. In some embodiments, a tentative conference confirmation is sent out to the non-blocking groups informing them to hold the date until final confirmation is received from the one or more blocking groups. In some embodiments, if a member of each blocking group does change plans to enable attendance, then the selected time slot is automatically confirmed, without further intervention by the organizer.

In some embodiments of step 280, the display indicates different blocking groups for conferences held at different times or locations or languages. For example, in some embodiments, a set of parallel time lines corresponding to the groups indicates the conference times prevented by each group using color. A green portion of the time line indicates that the corresponding group can attend a conference at that time; a yellow portion indicates that the corresponding group can not attend a conference at that time; and a red portion indicates that the corresponding group is the blocking group for a conference at that time.

In some embodiments a set of location maps correspond to the groups and indicate the conference locations that are prevented by each group using color. A green portion of the map indicates that the corresponding group can attend a conference at that location; a yellow portion indicates that the corresponding group can not attend a conference at that location; and a red portion indicates that the corresponding group is the blocking group for a conference at that location.

Based on this display, a manger of the blocking group can make management decisions regarding the blocking group or groups that may resolve the conflict and enable a conference to be scheduled. For example, a manger may determine what commitments are occupying the time slots of so many members of the blocking group, and remove one or more of those commitments. Alternatively, or in addition, the manager may add staff to one or more departments to which members of the blocking group belong, thus lightening the load on the members of the blocking group, and increasing the opportunity for finding a combination that satisfies the conference limits.

In some embodiments, step 280 includes providing the organizer with an option to change one or more limits set for the meeting in step 216. In various embodiments, the organizer is allowed to change one or more of the limits, either before or after sending messages, or both, to the blocking group or a manger of a member of the blocking group. In some embodiments, control passes back to step 216. Control then passes back to step 234 to determine if any combinations are within the new limits. For example, for purposes of illustration it is assumed that the organizer relaxes the limit on travel costs from $25,000 to $40,000 in step 280, and control passes back to step 234 to determine any combinations that satisfy the relaxed travel cost limit.

In some embodiments, step 280 includes providing the organizer with an option to change the definition of the quorum for the meeting in step 212. In various embodiments, the organizer is allowed to change quorum definition, either before or after sending messages, or both, to the blocking group or a manger of a member of the blocking group. In some embodiments, control passes back to step 212. Control then passes back to step 232 and 234 to determine new combinations and whether any new combinations are within the limits. For example, for purposes of illustration it is assumed that the organizer changes the quorum to just one member of group E, instead of two, and control passes back to step 232 and 234 to determine any new combinations satisfy the new quorum definition and conference limits.

In some embodiments, steps 238, 280 are omitted and the organizer is simply presented with a result that no conference could be scheduled.

4. Hardware Overview

Figure 3:
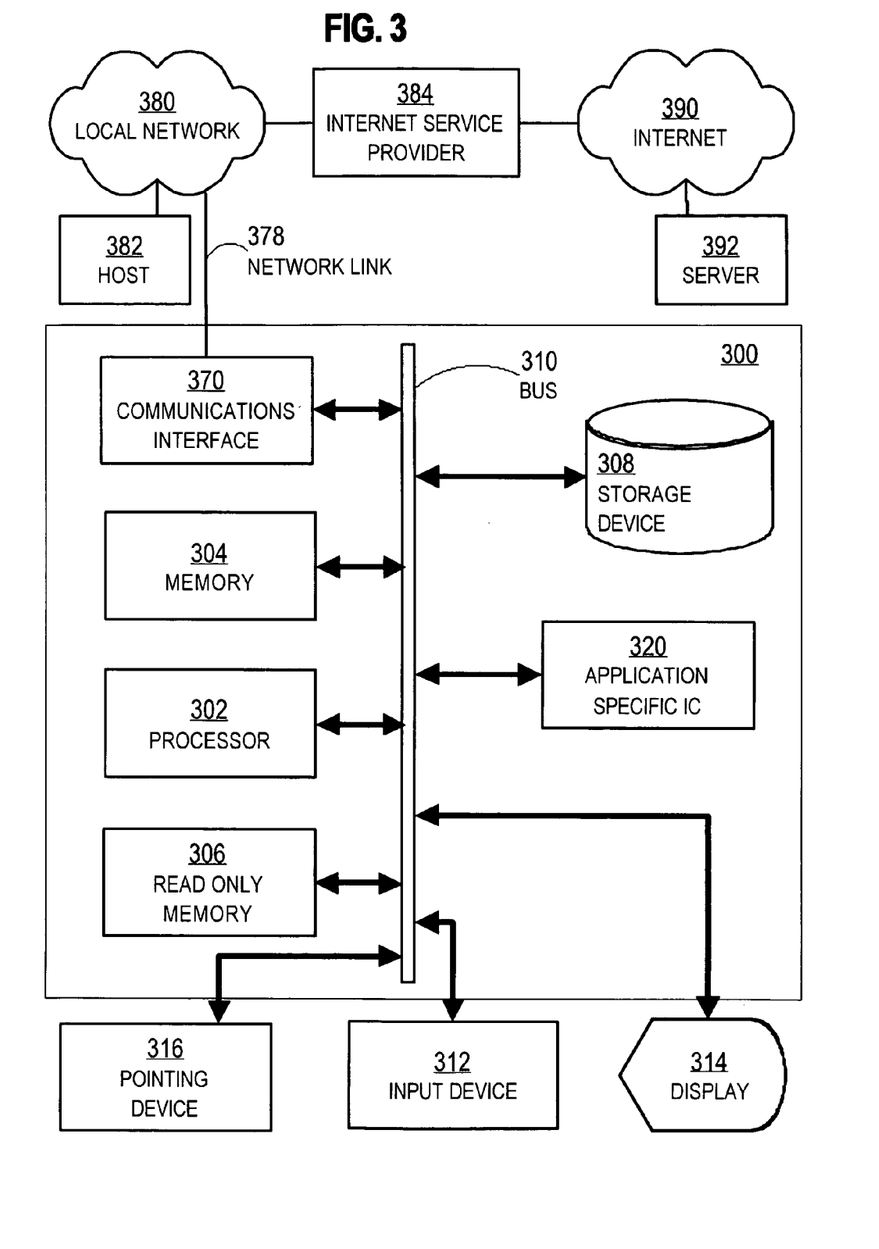
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a communication mechanism such as a bus 310 for passing information between other internal and external components of the computer system 300. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 310 includes many parallel conductors of information so that information is transferred quickly among devices coupled to the bus 310. One or more processors 302 for processing information are coupled with the bus 310. A processor 302 performs a set of operations on information. The set of operations include bringing information in from the bus 310 and placing information on the bus 310. The set of operations also typically include comparing two or more units of information, shifting positions of units of information, and combining two or more units of information, such as by addition or multiplication. A sequence of operations to be executed by the processor 302 constitute computer instructions.

Computer system 300 also includes a memory 304 coupled to bus 310. The memory 304, such as a random access memory (RAM) or other dynamic storage device, stores information including computer instructions. Dynamic memory allows information stored therein to be changed by the computer system 300. RAM allows a unit of information stored at a location called a memory address to be stored and retrieved independently of information at neighboring addresses. The memory 304 is also used by the processor 302 to store temporary values during execution of computer instructions. The computer system 300 also includes a read only memory (ROM) 306 or other static storage device coupled to the bus 310 for storing static information, including instructions, that is not changed by the computer system 300. Also coupled to bus 310 is a non-volatile (persistent) storage device 308, such as a magnetic disk or optical disk, for storing information, including instructions, that persists even when the computer system 300 is turned off or otherwise loses power.

Information, including instructions, is provided to the bus 310 for use by the processor from an external input device 312, such as a keyboard containing alphanumeric keys operated by a human user, or a sensor. A sensor detects conditions in its vicinity and transforms those detections into signals compatible with the signals used to represent information in computer system 300. Other external devices coupled to bus 310, used primarily for interacting with humans, include a display device 314, such as a cathode ray tube (CRT) or a liquid crystal display (LCD), for presenting images, and a pointing device 316, such as a mouse or a trackball or cursor direction keys, for controlling a position of a small cursor image presented on the display 314 and issuing commands associated with graphical elements presented on the display 314.

In the illustrated embodiment, special purpose hardware, such as an application specific integrated circuit (IC) 320, is coupled to bus 310. The special purpose hardware is configured to perform operations not performed by processor 302 quickly enough for special purposes. Examples of application specific ICs include graphics accelerator cards for generating images for display 314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 300 also includes one or more instances of a communications interface 370 coupled to bus 310. Communication interface 370 provides a two-way communication coupling to a variety of external devices that operate with their own processors, such as printers, scanners and external disks. In general the coupling is with a network link 378 that is connected to a local network 380 to which a variety of external devices with their own processors are connected. For example, communication interface 370 may be a parallel port or a serial port or a universal serial bus (USB) port on a personal computer. In some embodiments, communications interface 370 is an integrated services digital network (ISDN) card or a digital subscriber line (DSL) card or a telephone modem that provides an information communication connection to a corresponding type of telephone line. In some embodiments, a communication interface 370 is a cable modem that converts signals on bus 310 into signals for a communication connection over a coaxial cable or into optical signals for a communication connection over a fiber optic cable. As another example, communications interface 370 may be a local area network (LAN) card to provide a data communication connection to a compatible LAN, such as Ethernet. Wireless links may also be implemented. For wireless links, the communications interface 370 sends and receives electrical, acoustic or electromagnetic signals, including infrared and optical signals, that carry information streams, such as digital data. Such signals are examples of carrier waves.

The term computer-readable medium is used herein to refer to any medium that participates in providing instructions to processor 302 for execution. Such a medium may take many forms, including, but not limited to, non-volatile media, and volatile media. Non-volatile media include, for example, optical or magnetic disks, such as storage device 308. Volatile media include, for example, dynamic memory 304. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), or any other optical medium, punch cards, paper tape, or any other physical medium with patterns of holes, a RAM, a programmable ROM (PROM), an erasable PROM (EPROM), a FLASH-EPROM, or any other memory chip or cartridge, or any other medium from which a computer can read.

Network link 378 typically provides information communication through one or more networks to other devices that use or process the information. For example, network link 378 may provide a connection through local network 380 to a host computer 382 or to equipment 384 operated by an Internet Service Provider (ISP). ISP equipment 384 in turn provides data communication services through the public, world-wide packet-switching communication network of networks now commonly referred to as the Internet 390. A computer called a server 392 connected to the Internet provides a service in response to information received over the Internet. For example, server 392 provides information representing video data for presentation at display 314.

The invention is related to the use of computer system 300 for implementing the techniques described herein. According to one embodiment of the invention, those techniques are performed by computer system 300 in response to processor 302 executing one or more sequences of one or more instructions contained in memory 304. Such instructions, also called software and program code, may be read into memory 304 from another computer-readable medium such as storage device 308. Execution of the sequences of instructions contained in memory 304 causes processor 302 to perform the method steps described herein. In alternative embodiments, hardware, such as application specific integrated circuit 320, may be used in place of or in combination with software to implement the invention. Thus, embodiments of the invention are not limited to any specific combination of hardware and software.

The signals transmitted over network link 378 and other networks through communications interface 370, which carry information to and from computer system 300, are exemplary forms of carrier waves. Computer system 300 can send and receive information, including program code, through the networks 380, 390 among others, through network link 378 and communications interface 370. In an example using the Internet 390, a server 392 transmits program code for a particular application, requested by a message sent from computer 300, through Internet 390, ISP equipment 384, local network 380 and communications interface 370. The received code may be executed by processor 302 as it is received, or may be stored in storage device 308 or other non-volatile storage for later execution, or both. In this manner, computer system 300 may obtain application program code in the form of a carrier wave.

Various forms of computer readable media may be involved in carrying one or more sequence of instructions or data or both to processor 302 for execution. For example, instructions and data may initially be carried on a magnetic disk of a remote computer such as host 382. The remote computer loads the instructions and data into its dynamic memory and sends the instructions and data over a telephone line using a modem. A modem local to the computer system 300 receives the instructions and data on a telephone line and uses an infra-red transmitter to convert the instructions and data to an infra-red signal, a carrier wave serving as the network link 378. An infrared detector serving as communications interface 370 receives the instructions and data carried in the infrared signal and places information representing the instructions and data onto bus 310. Bus 310 carries the information to memory 304 from which processor 302 retrieves and executes the instructions using some of the data sent with the instructions. The instructions and data received in memory 304 may optionally be stored on storage device 308, either before or after execution by the processor 302.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for scheduling a conference among multiple persons, comprising:
    receiving group data that indicates a plurality of groups that include a first plurality of persons in a first group and a second plurality of persons in a second group different from the first plurality of persons in the first group;
    receiving availability data from a shared database that includes information about availability for a conference of a population plurality of persons that includes the first plurality of persons;
    receiving quorum data that indicates that a quorum for a particular conference includes any one or more persons in the first group and less than all persons in the first group and includes a particular number of persons from the second group, whereby the first group is a representative group; and
    determining, using a scheduling apparatus, a proposed time interval for the particular conference that satisfies the quorum based on the group data, the availability data, and the quorum data, the proposed time interval being determined prior to an invitation for the particular conference is sent.

2. The method as recited in claim 1, wherein receiving availability data further comprising receiving at least one of scheduled availability data based on data in a shared calendar database and current availability data based on presence data.

3. The method as recited in claim 1, wherein receiving availability data further comprising receiving availability data that is not derived based on placing a plurality of telephone calls to the first plurality of persons in the first group.

4. The method as recited in claim 1, further comprising determining at least one of a plurality of available persons that satisfy the quorum at the proposed time, one or more locations for the plurality of available persons, an estimated cost for the particular conference, a list of a minimum number of languages to carry on the particular conference among the plurality of available persons, and a measure of deviation of the proposed time from normal local working hours for the plurality of available persons.

5. The method as recited in claim 1, wherein determining the proposed time interval further comprises:
    determining a plurality of combinations of persons that satisfy the quorum; and
    selecting a particular combination from the plurality of combinations based on a conference preference criterion.

6. The method as recited in claim 5, wherein said conference preference criterion is based on at least one of available date, location, language, local time of day, and travel cost to attend the particular conference associated with each combination of the plurality of combinations.

7. The method as recited in claim 5, further comprising receiving from a user preference data indicating said conference preference criterion.

8. The method as recited in claim 5, wherein said conference preference criterion is that the particular combination is associated with a particular time interval that is earlier than a time interval associated with any other combination of the plurality of combinations.

9. The method as recited in claim 1, wherein receiving the quorum data further comprising receiving the quorum data indicating that the quorum for the particular conference includes any one person in the first group.

10. The method as recited in claim 1, wherein receiving quorum data further comprises receiving quorum data that indicates that the particular number of persons of the second group is zero, whereby the second group is an optional group.

11. The method as recited in claim 10, further comprising sending to the second plurality of persons in the second group alert data that indicates the proposed time interval for the particular conference and invites the second plurality of persons in the second group to join the particular conference.

12. The method as recited in claim 1, wherein receiving quorum data further comprises receiving quorum data that indicates that the particular number of persons of the second group is all persons of the second group, whereby the second group is a mandatory group.

13. The method as recited in claim 1, wherein receiving quorum data further comprises receiving quorum data that indicates that the particular number of persons of the second group is at least one and less than all persons of the second group, whereby the second group is a representative group.

14. The method as recited in claim 1, further comprising:
    receiving limit data that indicates a limit for a property of the particular conference wherein determining the proposed time interval further comprises determining whether both the quorum and the limit can be satisfied.

15. The method as recited in claim 14, wherein determining the proposed time further comprises, if it is determined that both the quorum and the limit cannot be satisfied, then:
    determining which of the plurality of groups is a blocking group that is most responsible for not satisfying the limit; and
    displaying blocking data that indicates the blocking group for the particular conference.

16. The method as recited in claim 15, wherein:
    determining which of the plurality of groups is a blocking group further comprises determining which person of the blocking group is a blocking person; and
    displaying the blocking data further comprises displaying blocking data that indicates the blocking person.

17. The method as recited in claim 14, said property of the particular conference including at least one of a date, a time of day, a location, a common language, and a travel cost.

18. The method as recited in claim 14, wherein:
    receiving limit data further comprises receiving limit data that indicates a plurality of specific dates for the particular conference, whereby the particular conference is a multi-date conference; and
    a combination of persons satisfies the limit if each person in the combination is available for more than one date of the plurality of specific dates for the multi-date conference.

19. The method as recited in claim 1, wherein receiving quorum data further comprising receiving quorum data that indicates a Boolean expression for combining a minimum number of persons from each group of the plurality of groups.

20. A non-transitory computer-readable medium carrying one or more sequences of instructions for scheduling a conference among multiple persons, wherein execution of the one or more sequences of instructions by one or more processors causes the one or more processors to perform the method of:

receiving group data that indicates a plurality of groups that include a first plurality of persons in a first group and a second plurality of persons in a second group different from the plurality of persons in the first group;

receiving availability data from a shared database that includes information about availability for a conference of a population plurality of persons that includes the first plurality of persons;

receiving quorum data that indicates that a quorum for a particular conference includes any one or more persons in the first group and less than all persons in the first group and includes a particular number of persons from the second group, whereby the first group is a representative group; and determining, prior to an invitation for the particular conference is sent, a proposed time interval for the particular conference that satisfies the quorum based on the group data, the availability data, and the quorum data.

21. The computer-readable medium as recited in claim 20, wherein receiving availability data further comprising receiving at least one of scheduled availability data based on data in a shared calendar database and current availability data based on presence data.

22. The computer-readable medium as recited in claim 20, wherein execution of the one or more sequences of instructions further causes the one or more processors to determine at least one of a plurality of available persons that satisfy the quorum at the proposed time, one or more locations for the plurality of available persons, an estimated cost for the particular conference, a list of a minimum number of languages to carry on the particular conference among the plurality of available persons, and a measure of deviation of the proposed time from normal local working hours for the plurality of available persons.

23. The computer-readable medium as recited in claim 20, wherein determining the proposed time interval further comprises:

determining a plurality of combinations of persons that satisfy the quorum; and selecting a particular combination from the plurality of combinations based on a conference preference criterion.

24. The computer-readable medium as recited in claim 23, wherein said conference preference criterion is based on at least one of available date, location, language, local time of day, and travel cost to attend the particular conference associated with each combination of the plurality of combinations.

25. The computer-readable medium as recited in claim 23, wherein execution of the one or more sequences of instructions further causes the one or more processors to receive a user preference data indicating said conference preference criterion.

26. The computer-readable medium as recited in claim 20, wherein:

execution of the one or more sequences of instructions further causes the one or more processors to receive limit data that indicates a limit for a property of the particular conference; and determining the proposed time interval further comprises determining whether both the quorum and the limit can be satisfied.

27. The computer-readable medium as recited in claim 26, said property of the particular conference including at least one of a date, a time of day, a location, a common language, and a travel cost.

28. The computer-readable medium as recited in claim 26, wherein determining the proposed time further comprises, if it is determined that both the quorum and the limit cannot be satisfied, then:

determining which of the plurality of groups is a blocking group that is most responsible for not satisfying the limit; and displaying blocking data that indicates the blocking group for the particular conference.

29. The computer-readable medium as recited in claim 20, wherein receiving quorum data further comprising receiving quorum data that indicates a Boolean expression for combining a minimum number of persons from each group of the plurality of groups.

30. An apparatus for scheduling a conference among multiple persons, comprising:

means for receiving group data that indicates a first plurality of persons in a first group;

means for receiving availability data from a shared database that includes information about availability for a conference of a population plurality of persons that includes the first plurality of persons;

means for receiving quorum data that indicates that a quorum for a particular conference includes any one or more persons in the first group and any one or more persons in a second group, whereby the first group is a representative group;

means for receiving limit data that indicates a limit for a property of the particular conference; and means for determining, prior to an invitation for the particular conference is sent, a proposed time interval for the particular conference that satisfies both the quorum and the limit based on the group data, the availability data, the limit data, and the quorum data.

31. The apparatus of claim 30, wherein the quorum data that indicates a Boolean expression for combining a minimum number of persons from the first group.

32. An apparatus for scheduling a conference among multiple persons, comprising:

a network interface that is coupled to a network for communicating one or more packet flows therewith;

one or more processors; and one or more stored sequences of instructions which, when executed by the one or more processors, causes the one or more processors to carry out:

receiving group data that indicates a plurality of groups that include a first plurality of persons in a first group and a second plurality of persons in a second group different from the plurality of persons in the first group;

receiving availability data from a shared database that includes information about availability for a conference of a population plurality of persons that includes the first plurality of persons;

receiving quorum data that indicates that a quorum for a particular conference includes any one or more persons in the first group and less than all persons in the first group and a particular number of persons from the second group, whereby the first group is a representative group; and determining, prior to an invitation for the particular conference is sent, a proposed time interval for the particular conference that satisfies the quorum based on the group data, the availability data, and the quorum data.

33. The apparatus as recited in claim 32, wherein receiving availability data further comprises receiving at least one of scheduled availability data based on data in a shared calendar database and current availability data based on presence data.

34. The apparatus as recited in claim 32, wherein receiving availability data further comprises receiving availability data that is not derived based on placing a plurality of telephone calls to the first plurality of persons in the first group.

35. The apparatus as recited in claim 32, wherein executing the one or more stored sequences of instructions further causes the one or more processors to carry out determining at least one of a plurality of available persons that satisfy the quorum at the proposed time, one or more locations for the plurality of available persons, an estimated cost for the particular conference, a list of a minimum number of languages to carry on the particular conference among the plurality of available persons, and a measure of deviation of the proposed time from normal local working hours for the plurality of available persons.

36. The apparatus as recited in claim 32, wherein determining the proposed time interval further comprises:
   determining a plurality of combinations of persons that satisfy the quorum; and
   selecting a particular combination from the plurality of combinations based on a conference preference criterion.

37. The apparatus as recited in claim 36, wherein said conference preference criterion is based on at least one of available date, location, language, local time of day, and travel cost to attend the particular conference associated with each combination of the plurality of combinations.

38. The apparatus as recited in claim 36, wherein executing the one or more stored sequences of instructions further causes the one or more processors to receive a user preference data indicating said conference preference criterion.

39. The apparatus as recited in claim 36, wherein said conference preference criterion is that the particular combination is associated with a particular time interval that is earlier than a time interval associated with any other combination of the plurality of combinations.

40. The apparatus as recited in claim 32, wherein receiving the quorum data further comprises receiving the quorum data indicating that the quorum for the particular conference includes any one person in the first group.

41. The apparatus as recited in claim 32, wherein receiving quorum data further comprises receiving quorum data that indicates that the particular number of persons of the second group is zero, whereby the second group is an optional group.

42. The apparatus as recited in claim 41, wherein executing the one or more stored sequences of instructions further causes the one or more processors to send to the second plurality of persons in the second group alert data that indicates the proposed time interval for the particular conference and invites the second plurality of persons in the second group to join the particular conference.

43. The apparatus as recited in claim 32, wherein receiving quorum data further comprises receiving quorum data that indicates that the particular number of persons of the second group is all persons of the second group, whereby the second group is a mandatory group.

44. The apparatus as recited in claim 32, wherein receiving quorum data further comprises receiving quorum data that indicates that the particular number of persons of the second group is at least one and less than all persons of the second group, whereby the second group is a representative group.

45. The apparatus as recited in claim 32, wherein:
   executing the one or more stored sequences of instructions further causes the one or more processors to receive limit data that indicates a limit for a property of the particular conference; and
   determining the proposed time interval further comprises determining whether both the quorum and the limit can be satisfied.

46. The apparatus as recited in claim 45, wherein determining the proposed time further comprising, if it is determined that both the quorum and the limit cannot be satisfied, then:
   determining which of the plurality of groups is a blocking group that is most responsible for not satisfying the limit; and
   displaying blocking data that indicates the blocking group for the particular conference.

47. The apparatus as recited in claim 46, wherein:
   determining which of the plurality of groups is a blocking group further comprises determining which person of the blocking group is a blocking person; and
   displaying the blocking data further comprises displaying blocking data that indicates the blocking person.

48. The apparatus as recited in claim 45, said property of the particular conference including at least one of a date, a time of day, a location, a common language, and a travel cost.

49. The apparatus as recited in claim 45, wherein:
   receiving limit data further comprises receiving limit data that indicates a plurality of specific dates for the particular conference, whereby the particular conference is a multi-date conference; and
   a combination of persons satisfies the limit if each person in the combination is available for more than one date of the plurality of specific dates for the multi-date conference.

50. The apparatus as recited in claim 32, wherein receiving quorum data further comprising receiving quorum data that indicates a Boolean expression for combining a minimum number of persons from each group of the plurality of groups.

* * * * *